US011955117B2

United States Patent
McDermid et al.

(10) Patent No.: US 11,955,117 B2
(45) Date of Patent: Apr. 9, 2024

(54) SYSTEM AND METHOD FOR ANALYZING AND REACTING TO INTERACTIONS BETWEEN ENTITIES USING ELECTRONIC COMMUNICATION CHANNELS

(71) Applicant: The Toronto-Dominion Bank, Toronto (CA)

(72) Inventors: Bridget McDermid, Acton (CA); Brian Bellwood, Rockaway, NJ (US); Natalie Thien Huong Cornwall, London (CA); Jeffery David True, Ottawa (CA); Ryan Wall, Blackwood, NJ (US); Stella Pui Kwan Chan, Markham (CA); Venetia D'Souza, Toronto (CA); Christopher Michael Arthur Caravan, Riverview (CA); Pranavan Premathas, Toronto (CA); Sahifa Habib Qazi, Toronto (CA); Mah Noor Siddiqui, Mississauga (CA); Joe Moghaizel, Toronto (CA); Jonathan K. Barnett, Oakville (CA)

(73) Assignee: The Toronto-Dominion Bank, Toronto (CA)

( * ) Notice: Subject to any disclaimer, the term of this patent is extended or adjusted under 35 U.S.C. 154(b) by 92 days.

(21) Appl. No.: 17/303,345

(22) Filed: May 27, 2021

(65) Prior Publication Data
US 2022/0383865 A1    Dec. 1, 2022

(51) Int. Cl.
*G06F 40/30*    (2020.01)
*G10L 15/18*    (2013.01)
(Continued)

(52) U.S. Cl.
CPC .......... *G10L 15/1822* (2013.01); *G06F 40/30* (2020.01); *G10L 15/1815* (2013.01);
(Continued)

(58) Field of Classification Search
None
See application file for complete search history.

(56) References Cited

U.S. PATENT DOCUMENTS 8,340,274 B2    12/2012  Saushkin
8,463,606 B2     6/2013  Scott et al.
(Continued)

FOREIGN PATENT DOCUMENTS

WO    2019/099894 A1    5/2019
WO    2019/245948 A1    7/2019

OTHER PUBLICATIONS

Kehal, Bally; How to Predict Customer Needs with Automated Intent Extraction; Medium.com; Aug. 7, 2019; https://medium.com/aiautomation/how-to-predict-customer-needs-with-automated-intent-extraction-90f5443ceca1; retrieved from the Internet May 26, 2021.

*Primary Examiner* — Richard Z Zhu
(74) *Attorney, Agent, or Firm* — CPST Intellectual Property Inc.; Brett J. Slaney

(57) ABSTRACT

A system and method are provided for analyzing and reacting to interactions between entities using electronic communication channels. The method includes receiving, via the communications module, data captured from a conversational exchange between a first entity communicating with a second entity using an electronic communication channel. The method also includes analyzing the captured data to detect an indication that the first entity is or was distracted during the conversational exchange, is or was disinterested in a portion of the conversational exchange or missed the portion of the conversational exchange. The method also includes determining based on the indication an action to address the distraction during, disinterest in, or missing of, the portion of the conversational exchange; and providing, via the communications module, an automated message to at (Continued)

least one of the first entity and the second entity for executing the action.

20 Claims, 10 Drawing Sheets

(51) Int. Cl.
  *G10L 15/22* (2006.01)
  *H04M 3/56* (2006.01)
(52) U.S. Cl.
  CPC .. *G10L 2015/221* (2013.01); *G10L 2015/228* (2013.01); *H04M 3/56* (2013.01); *H04M 2203/357* (2013.01)

(56) References Cited

U.S. PATENT DOCUMENTS

| | | | |
|---|---|---|---|
| 8,504,375 B2 * | 8/2013 | Onishi | G10L 15/26 704/235 |
| 8,588,396 B2 | 11/2013 | Stent et al. | |
| 8,660,251 B2 * | 2/2014 | Miller | H04M 3/42153 709/204 |
| 9,077,804 B2 | 7/2015 | Kannan et al. | |
| 9,313,330 B1 * | 4/2016 | Cordell | H04L 51/04 |
| 9,418,117 B1 * | 8/2016 | Molina | G06F 16/24578 |
| 9,443,518 B1 * | 9/2016 | Gauci | G06F 40/169 |
| 9,692,895 B1 | 6/2017 | Ouimette et al. | |
| 9,723,151 B2 | 8/2017 | McGann et al. | |
| 9,806,894 B2 * | 10/2017 | Kozloski | H04L 12/1818 |
| 9,992,336 B2 | 6/2018 | Scott et al. | |
| 10,038,786 B2 | 7/2018 | Kannan et al. | |
| 10,044,862 B1 | 8/2018 | Cai et al. | |
| 10,171,659 B2 | 1/2019 | Riahi et al. | |
| 10,341,742 B1 * | 7/2019 | Kim | H04N 21/4122 |
| 10,484,541 B2 | 11/2019 | Kannan et al. | |
| 10,506,089 B2 * | 12/2019 | Crowell | H04M 7/0054 |
| 10,582,056 B2 | 3/2020 | Dwyer et al. | |
| 10,635,695 B2 | 4/2020 | Seth et al. | |
| 10,645,224 B2 | 5/2020 | Dwyer et al. | |
| 10,693,824 B2 * | 6/2020 | Silva | H04L 12/1831 |
| 10,694,038 B2 | 6/2020 | Abraham et al. | |
| 10,713,662 B1 | 7/2020 | Narayanan et al. | |
| 10,726,333 B2 | 7/2020 | Cai et al. | |
| 10,827,071 B1 | 7/2020 | Cai et al. | |
| 10,888,271 B2 * | 1/2021 | Falevsky | A61B 5/486 |
| 10,977,663 B1 * | 4/2021 | Liao | G06N 20/00 |
| 11,178,282 B1 * | 11/2021 | Ramachandran | H04M 3/5175 |
| 11,314,944 B2 * | 4/2022 | Lewis | G06F 40/35 |
| 11,336,539 B2 * | 5/2022 | Rath | H04L 41/5074 |
| 11,451,885 B1 * | 9/2022 | Chandrashekar | H04N 21/4788 |
| 2003/0154072 A1 * | 8/2003 | Young | G06F 16/40 704/E15.045 |
| 2009/0027484 A1 | 1/2009 | Erhart et al. | |
| 2009/0225971 A1 * | 9/2009 | Miller | H04M 3/42153 379/202.01 |
| 2010/0034366 A1 * | 2/2010 | Basson | G10L 15/26 379/202.01 |
| 2013/0182063 A1 * | 7/2013 | Jaiswal | H04L 65/4038 348/E7.083 |
| 2015/0081663 A1 * | 3/2015 | Raniere | G06F 16/437 707/708 |
| 2015/0304492 A1 * | 10/2015 | Eyeson | H04M 3/5175 379/265.1 |
| 2016/0036980 A1 | 2/2016 | Ristock et al. | |
| 2016/0275952 A1 * | 9/2016 | Kashtan | H04M 3/569 |
| 2017/0154264 A1 | 6/2017 | Chen et al. | |
| 2020/0265485 A1 * | 8/2020 | Pachauri | G06Q 10/06398 |
| 2020/0349614 A1 | 11/2020 | Batcha et al. | |
| 2021/0065203 A1 * | 3/2021 | Billigmeier | G06N 20/00 |
| 2021/0327416 A1 * | 10/2021 | Clark | G06F 3/147 |

* cited by examiner

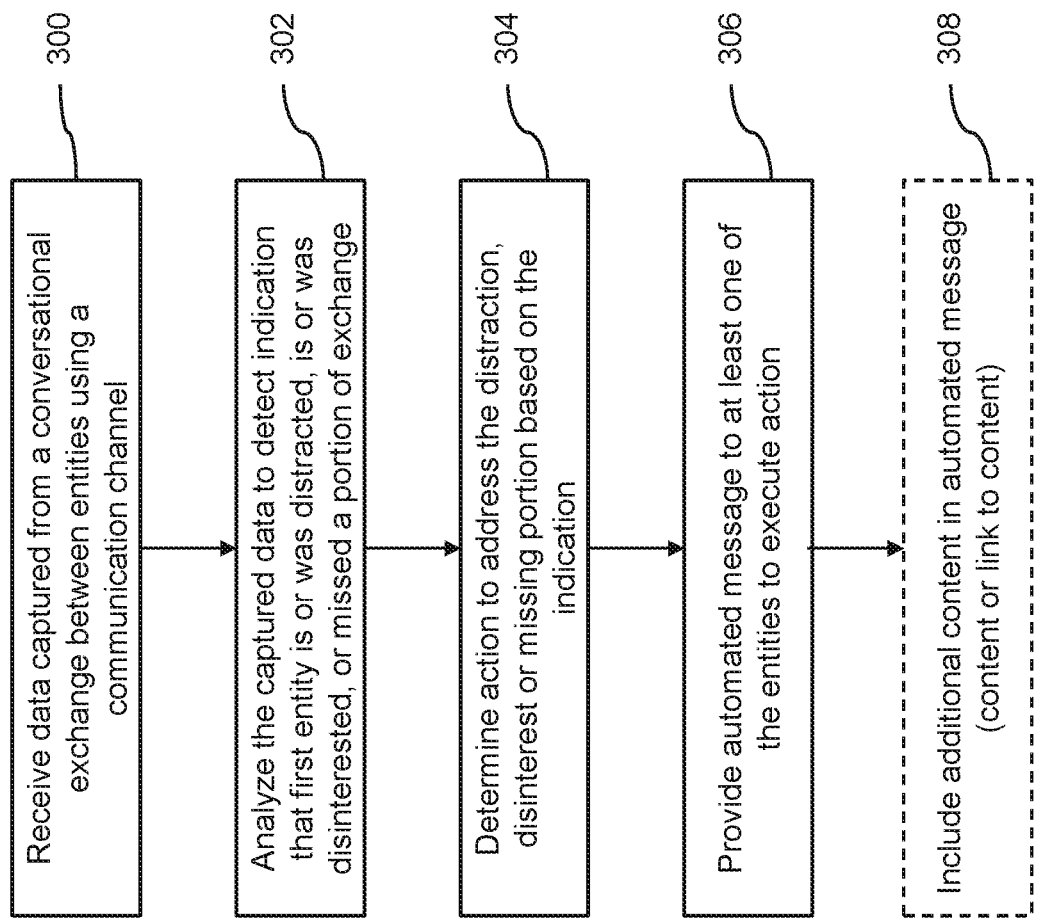

SYSTEM AND METHOD FOR ANALYZING AND REACTING TO INTERACTIONS BETWEEN ENTITIES USING ELECTRONIC COMMUNICATION CHANNELS

TECHNICAL FIELD

The following relates generally to analyzing and reacting to interactions between entities which are using electronic communication channels.

BACKGROUND

A challenge that faces contact centers and other customer service agents is the amount of time that each call or interaction takes to handle. This issue can be quantified using various metrics, such as the "average handle time" or "AHT". One goal within a contact center is to lower the AHT to enable a higher throughput of calls and thus an increased level of satisfaction to those calling in.

For example, reducing the AHT can shorten the wait times for a new customer entering the queue to be handed off to an agent. Lowering AHT can be a difficult task since customer questions, demands, understanding, and the ability to solve an issue can vary widely. However, it is found that customers may call back repeatedly about the same issue (suggesting they did not understand or absorb the contact center help) and often multiple (or many) customers may call in about the same or similar issues. In either case, if the system used by the agents, or processes employed by the system, can take steps to avoid call-backs or multiple calls on the same issue, AHT can be lowered.

BRIEF DESCRIPTION OF THE DRAWINGS

Embodiments will now be described with reference to the appended drawings wherein:

FIG. 11 is a flow diagram of an example of computer executable instructions for analyzing and reacting to interactions between entities which are using electronic communication channels.

DETAILED DESCRIPTION

Figure 1:
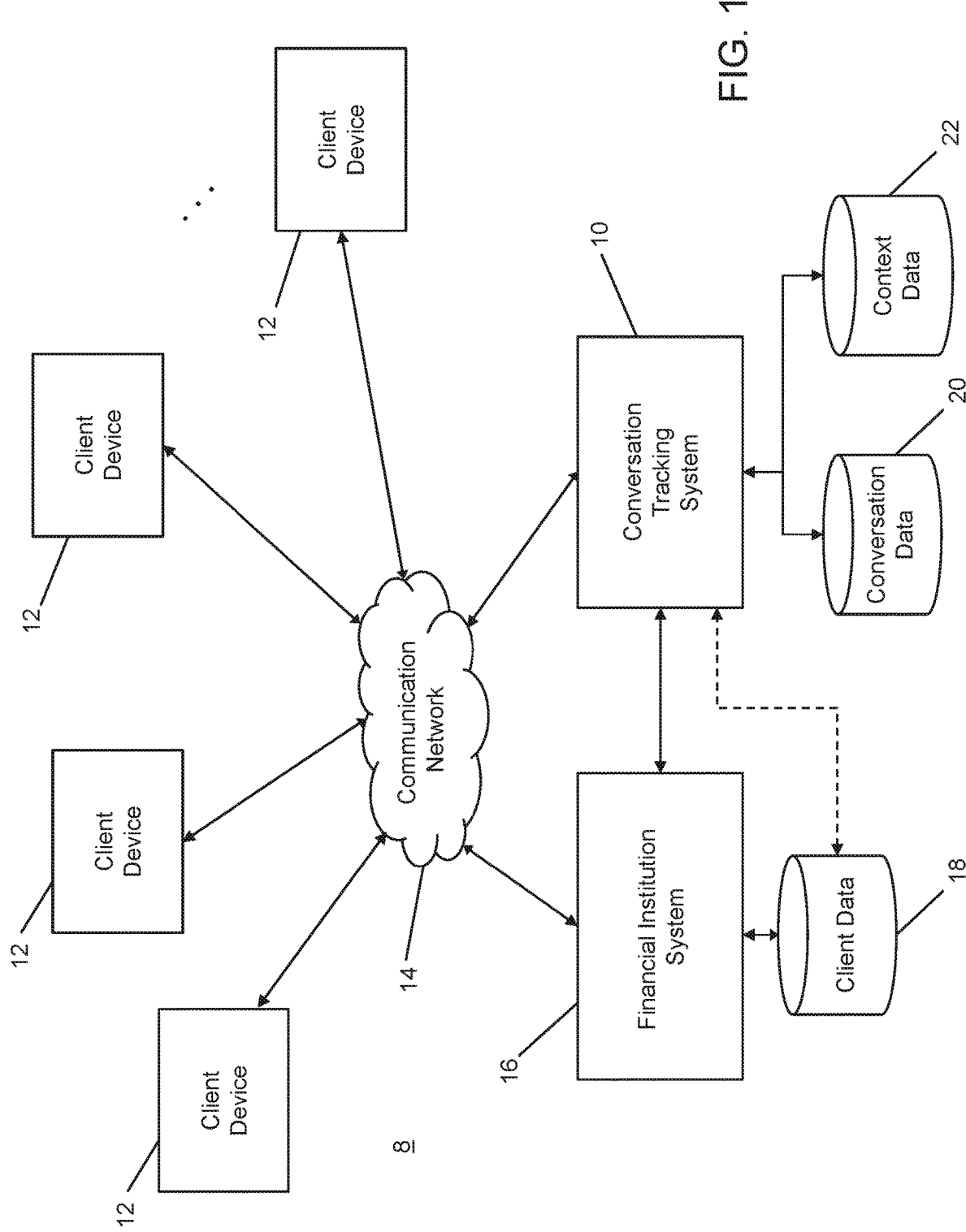
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

Contact center agents typically have access to data about a customer, such as profile data or context regarding interactions with other channels. Conversations may be recorded (e.g., for quality or training purposes), but this is done separately from the actual interactions with the customers. From available information and interactions, there can be a problem with how to infer or predict a customer's intentions or issues they may be experiencing. There can also a problem with how to translate this into actionable ways to reduce non-productive AHT.

A system is provided that can be used to infer or predict customer engagement, intent, comprehension and understanding of content and services, to limit or avoid unproductive "handling time" with customers through call center channels; and/or to leverage these interactions to enhance services provided by agents. The system can be operated to capture data associated with a client/agent interaction or other interactions between entities, such as by creating and/or reviewing a "script" of the conversation (audio, video, chat) or detecting certain indicators or indications on the fly. This data can be analyzed, either in real-time or offline to generate an output that uses the data itself, or augmented data, to provide something actionable to reduce AHT or avoid contact center interactions altogether.

In an implementation, the system can execute a real-time analysis of the conversation or exchange between an agent and a customer to detect distractions, disinterest, or unabsorbed content, and follow-up with alerts or notifications. Such alerts or notifications can include additional information, such as content from the exchange or additional content deemed to be helpful in ameliorating the issues detected in the exchange. The real-time analysis can be used to alert either or both the agent and the client.

The system can be or can include a conversation tracker that can record or otherwise capture the content of the exchange between agent and customer and store conversation data. This conversation data can be used with context data that may be available from other channels and/or interactions, and client data that can include profile data, financial data, preferences, e-statements, etc.

The conversation tracker can leverage artificial intelligence (AI)/machine learning (ML) tools and techniques to perform predictive or probabilistic analytics, or to build and refine models that are used to predict or infer customer intents or to otherwise automate the process of leveraging the conversation data. The conversation tracker can access or be accessed by various channels used within the system, such as live channels (voice, video), email, SMS/text, chat or other website channels such as forms. The conversation tracker can also be configured to interface with agents, for example, via an internal contact center user interface (UI) and to interface with the customer via one or more channels that the customer uses. For example, the customer may use phone calls to discuss issues but also have email and website/app access for additional engagement.

With respect to distraction tracking and follow-up, a real time analysis of the interaction (e.g., speech/chat/video) can be conducted to determine content being discussed when the customer is distracted (either by facial or environmental analyses (e.g., noises in the background/quick velocity changes/etc.) and having an automated message with content sent to the customer (e.g., public site links/tutorials, etc.) The conversation tracker can also incorporate other methods to identify distractions such as verbal/non-verbal customer cues/change of focus on device, etc. An agent prompter can also be provided that highlights deviations from a main conversation by using natural language understanding (NLU) and natural language processing (NLP). The data acquired by the system can also be used to gauge customer confidence in topics covered in the interaction (e.g., by tone, attention, language used, etc.)

It will be appreciated that while examples provided herein are directed to agent-client interactions in a financial institution environment, the principles discussed herein equally apply to other communication channels and interactive/communication services between any two entities, for example, any customer service, e-learning, training, or other instructive interaction.

Certain example systems and methods described herein are able to analyze and react to interactions between entities which are using electronic communication channels. In one aspect, there is provided a device for analyzing and reacting to interactions between entities using electronic communication channels. The device includes a processor, a communications module coupled to the processor, and a memory coupled to the processor. The memory stores computer executable instructions that when executed by the processor cause the processor to receive, via the communications module, data captured from a conversational exchange between a first entity communicating with a second entity using an electronic communication channel. The memory also stores computer executable instructions that when executed by the processor cause the processor to analyze the captured data to detect an indication that the first entity is or was distracted during the conversational exchange, is or was disinterested in a portion of the conversational exchange, or missed the portion of the conversational exchange. The memory also stores computer executable instructions that when executed by the processor cause the processor to determine based on the indication an action to address the distraction during, disinterest in, or missing of, the portion of the conversational exchange; and provide, via the communications module, an automated message to at least one of the first entity and the second entity for executing the action.

In another aspect, there is provided a method of analyzing and reacting to interactions between entities using electronic communication channels. The method is executed by a device having a communications module. The method includes receiving, via the communications module, data captured from a conversational exchange between a first entity communicating with a second entity using an electronic communication channel. The method also includes analyzing the captured data to detect an indication that the first entity is or was distracted during the conversational exchange, is or was disinterested in a portion of the conversational exchange, or missed the portion of the conversational exchange. The method also includes determining based on the indication an action to address the distraction during, disinterest in, or missing of, the portion of the conversational exchange; and providing, via the communications module, an automated message to at least one of the first entity and the second entity for executing the action.

In another aspect, there is provided a non-transitory computer readable medium for analyzing and reacting to interactions between entities using electronic communication channels. The computer readable medium includes computer executable instructions for receiving, via a communications module, data captured from a conversational exchange between a first entity communicating with a second entity using an electronic communication channel. The computer readable medium also includes computer executable instructions for analyzing the captured data to detect an indication that the first entity is or was distracted during the conversational exchange, is or was disinterested in a portion of the conversational exchange, or missed the portion of the conversational exchange. The computer readable medium also includes computer executable instructions for determining based on the indication an action to address the distraction during, disinterest in, or missing of, the portion of the conversational exchange; and providing, via the communications module, an automated message to at least one of the first entity and the second entity for executing the action.

In certain example embodiments, the device can obtain a model trained by applying one or more machine learning techniques to prior conversational exchanges between a plurality of entities to identify one or more expected conversation paths according to a topic associated with conversational exchange between the first and second entities; use the model to detect when the conversational exchange deviated from one of the expected conversation paths; and use the automated message, via the communications module, to return the first and second entities to a point prior to the deviation or to a new conversation path.

In certain example embodiments, the automated message can be sent to the first entity via the communications module, following a termination of the conversational exchange and includes additional content or a link to the additional content associated with the portion of the conversation exchange to supplement the conversational exchange.

In certain example embodiments, the device can generate a conversation script from the captured data, wherein the conversation script is analyzed to detect the distraction during, disinterest in, or missing of, the portion of the conversational exchange.

In certain example embodiments, the automated message can include a portion of the conversation script or a link to the conversation script. The message can include a link to additional content associated with the portion of the conversation exchange, in the automated message.

In certain example embodiments, the automated message can include a notification sent to the first entity regarding the distraction during, disinterest in, or missing of, the portion of the conversational exchange. The notification can provide an option to flag the portion of the conversational exchange for reiteration. The notification can also provide an option to skip over the portion of the conversation exchange.

In certain example embodiments, the automated message can include a notification sent to the second entity, via the communications module, flagging the indication of the distraction during, disinterest in, or missing of, the portion of the conversational exchange. The notification can provide an option to send additional information to the first entity. The notification can also provide an option to trigger an automated conversation follow-up message to be sent via the communications module, a period of time after the conversational exchange terminates.

FIG. 1 illustrates an exemplary computing environment 8. In one aspect, the computing environment 8 may include a conversation tracking system 10, one or more client devices 12, and a communications network 14 connecting one or more components of the computing environment 8.

The computing environment 8 may also include a financial institution system 16 (e.g., for a commercial bank) that provides financial services accounts to users and processes financial transactions associated with those financial service accounts. This can include providing customer service options via one or more channels, such as via a call center, a messaging service via a website, email inquiries, etc. While several details of the financial institution system 16 have been omitted for clarity of illustration, reference will be made to FIG. 5 below for additional details.

The financial institution system 16 includes or otherwise has access to a datastore for storing client data 18. The conversation tracking system 10 includes or otherwise has access to conversation data 20 and context data 22. The datastores 20, 22 may include any information or content, such as conversation scripts, metadata, tags, notes, files (e.g., PDFs), links (e.g., uniform resource locators (URLs)), images, videos, etc. that are created from or otherwise relate to interactions (e.g., conversations) between entities in the computing environment 8, in particular those made using client devices 12 via one or more communication channels available via the communication network 14 or other communication networks 14. As such, the data stored in the data stores 20, 22 can be used by the conversation tracking system 10 in performing operations such as those described herein. The client data 18 may include both data associated with a user of a client device 12 that interacts with the conversation tracking system 10 and financial institution system 16 (e.g., for participating in mobile banking and using customer service channels associated with such banking) and transaction history data that is captured and provided with a transaction entry, e.g., in the graphical user interface of a mobile or web-based banking application. The data associated with a user can include client profile data that may be mapped to corresponding financial data 98 (see FIG. 5) for that user and/or may include some of the financial data 98. It can be appreciated that the financial data 98 shown in FIG. 5 could also include the client data 18 shown in FIG. 1 and these datastores are shown separately for illustrative purposes. The client profile data can include both data that is associated with a client as well as data that is associated with one or more user accounts for that client as recognized by the computing environment 8.

The data associated with a client may include, without limitation, demographic data (e.g., age, gender, income, location, etc.), preference data input by the client, and inferred data generated through machine learning, modeling, pattern matching, or other automated techniques. The client profile data may also include historical interactions and transactions associated with the conversation tracking system 10 and/or financial institution system 16, e.g., login history, search history, communication logs, metadata, files, documents, etc.

It can be appreciated that the datastores 20, 22 are shown as separate components from the conversation tracking system 10 for illustrative purposes only and may also be at least partially stored within a database, memory, or portion thereof within the conversation tracking system 10. It can also be appreciated that while the conversation tracking system 10 and financial institution system 16 are shown as separate entities in FIG. 1, they may also be part of the same system. For example, the conversation tracking system 10 can be hosted and provided as part of the financial institution system 16.

As used herein, a "conversation" or "conversation tracking" may refer to any interaction or communication between entities in the computing environment 8 such as, but not limited to, an agent entity and a client, customer or user entity. It can also be appreciated that such entities can be associated with devices such as the client devices 12 that are operated by users, including such customers, customer service agents, administrators, and virtual bots and other services.

Client devices 12 may be associated with one or more users. Users may be referred to herein as customers, clients, correspondents, agents, or other entities that interact with the financial institution system 16 and/or conversation tracking system 10 (directly or indirectly). The computing environment 8 may include multiple client devices 12, each client device 12 being associated with a separate user or associated with one or more users. In certain embodiments, a user may operate client device 12 such that client device 12 performs one or more processes consistent with the disclosed embodiments. For example, the user may use client device 12 to engage and interface with a mobile or web-based banking application which permits the conversation tracking system 10 to assist in augmenting interactions with other entities such as agents who may also be utilizing a client device 12. In certain aspects, client device 12 can include, but is not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication network 14.

Communication network 14 may include a telephone network, cellular, and/or data communication network to connect different types of client devices 12. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

In one embodiment, conversation tracking system 10 may be one or more computer systems configured to process and store information and execute software instructions to perform one or more processes consistent with the disclosed embodiments. In certain embodiments, although not required, conversation tracking system 10 may be associated with one or more business entities. In certain embodiments, the conversation tracking system 10 may represent or be part of any type of business entity. For example, conversation tracking system 10 may be a system associated with a commercial bank (e.g., financial institution system 16), a retailer, utility, government entity, educational institution, or some other type of business. The conversation tracking system 10 can also operate as a standalone entity that is configured to serve multiple business entities, e.g., to act as an agent therefor.

Continuing with FIG. 1, the conversation tracking system 10 and/or financial institution system 16 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the conversation tracking system 10 and financial institution system 16. The cryptographic server may be used to protect the financial data 98 and/or client data 18 and/or data stored in the datastores 20, 22 by way of encryption for data protection, digital signatures or message digests for data integrity, and by using digital certificates to authenticate the identity of the users and client devices 12 with which the financial institution system 16 and/or conversation tracking system 10 communicates to inhibit data breaches by adversaries. It can be appreciated that various cryptographic mechanisms and protocols can be chosen and implemented to suit the constraints and requirements of the particular deployment of the conversation tracking system 10 or financial institution system 16 as is known in the art.

Figure 2:
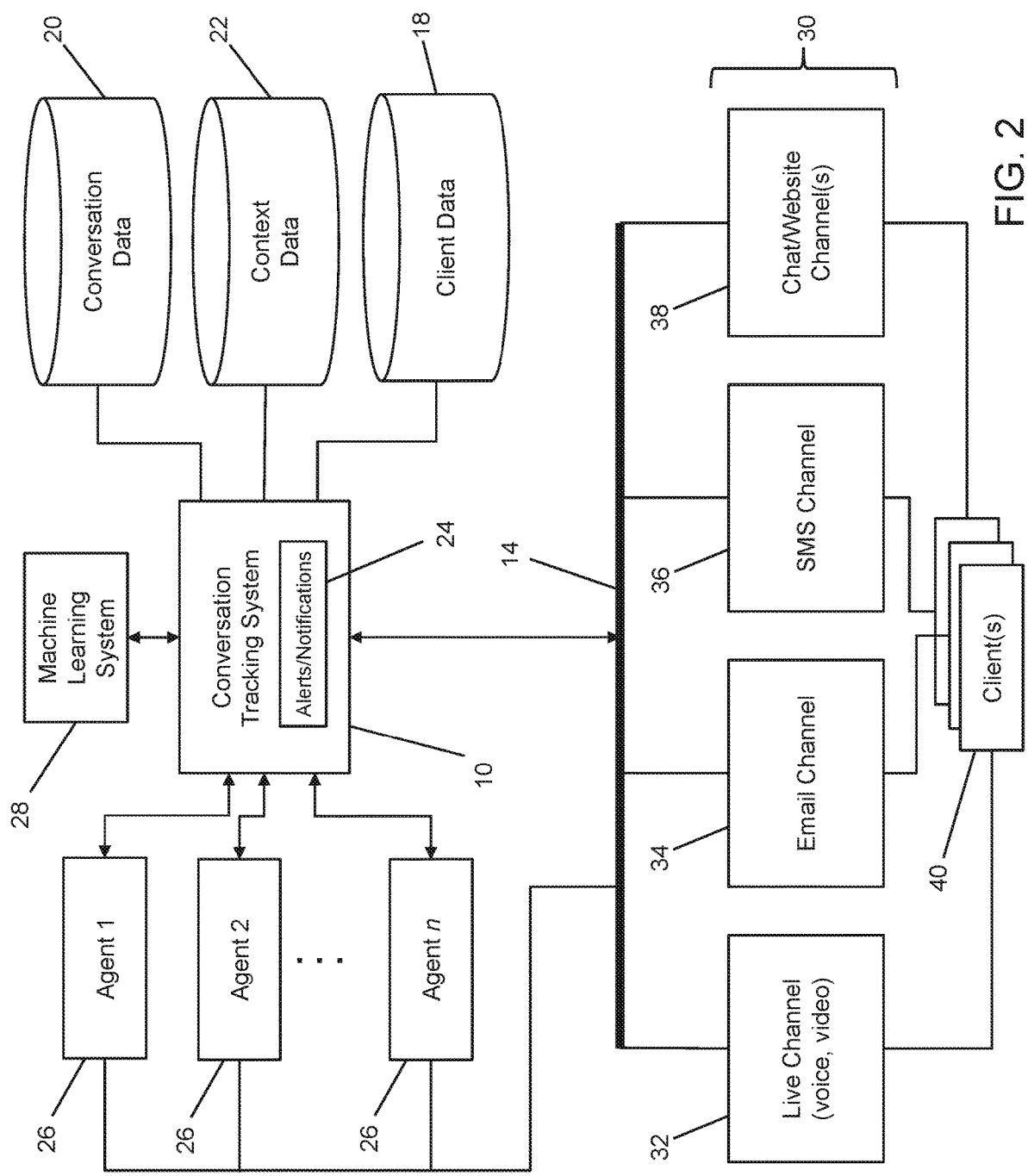
FIG. 2 is a schematic diagram of a conversation tracking system coupled to multiple agent entities and coupled to multiple client entities over multiple communication channels.

Referring now to FIG. 2, the conversation tracking system 10 is shown coupled to a number of agents 26 and a number of clients 40. The conversation tracking system 10 is configured to track or otherwise review or analyze interactions such as conversations that occur via various communication channels 30, e.g., by accessing such channels 30 via the communication network 14. The conversation tracking system 10 includes an alerts/notifications module 24 that is used to interact with the agents 26 and/or the clients 40 during or after a conversational exchange between the agent 26 and the client 40, to execute an action in response to detecting an indication in the conversational exchange of a distraction, disinterest, or missed content, in particular with respect to interactions by the client 40. For example, the client 40 can participate in a conversational exchange with an agent 26 via a call center or other customer service channel. However, during the conversational exchange, the client 40 may not fully understand certain content, which could later lead to a call-back to the agent 26 or another agent 26, thus increasing the overall AHT. To decrease the likelihood that the client 40 calls back, the conversation tracking system 10 can be used to determine which content is not fully understood, to follow up with additional content, reminders, links to useful materials, etc. For example, the client 40 may have been distracted during the conversational exchange or missed some content by switching attention to a different channel 30.

Similarly, the conversational exchange may include content that is familiar to the client 40 and the client 40 may exhibit disinterest in that content. This can be detected through behavioral cues such as the aforementioned distractedness or through context such as previous exchanges with that client 40. For example, during the conversational exchange, the conversation tracking system 10 can access the context data 22 to determine that the client 40 is familiar with a topic and notify the agent 26 to ensure that the more interesting or important content is prioritized. The client 40 can also provide a cue or input indicative of their understanding in real-time rather than via context data 22 and thus the conversational tracking system 10 can also react dynamically to cues provided during the conversational exchange. It can be appreciated that behavioral cues detected by the conversation tracking system 10 can use available distraction detection software or modules that can be installed and implemented on the client device 12. The conversation tracking system 10 can also leverage existing modules in the client device 12 with appropriate permissions, such as software used to detect distracted driving or to detect facial cues or other inputs. Such software and any hardware modules are not shown explicitly in FIG. 2 or FIG. 6 described below for ease of illustration but can be leveraged when available to the conversation tracking system 10.

The conversation tracking system 10 includes or has access to a machine learning system 28, which can be employed to train one or more models based on conversation histories to determine likely conversation paths based on a topic, or to develop classifiers, rules or flags or other indicators that can be used to permit the conversational tracking system 10 to detect and react to cues in the conversational exchange. The machine learning system 28 can employ various machine learning techniques and can be used over time to continuously train and retrain models based on new conversation data 20, context data 22 and client data 20 as discussed in greater detail below.

The conversation tracking system 10 can be coupled to the agents 26 and clients 40 via various communication channels 30 as well as has the capability to access conversational exchanges on such channels 30 both in real-time and offline using data captured during the conversational exchange, such as by generating a conversation script and storing the conversation script as part of the conversation data 20. A conversation script refers to a summary or transcript of a conversation, for example, by recording the conversation and generating a textual output using NPL and/or NLU techniques provided by the machine learning system 28. It can be appreciated that the conversation script is one example of conversation data 20, which can also include tags, flags, summary snippets indicative of a topic or point in time, audio clips, or any other data that can be used to determine an action to be taken either during or after the conversational exchange in order to avoid additional AHT. For example, the conversation data 20 can record time stamps with an associated topics and associate content with the topics and send that content in an alert to the client 40 and/or agent 26. The conversation tracking system 10 can also simply react to detected distractions or disinterest during the conversational exchange and send a real-time alert or notification to the client 40 or agent 26 to avoid a follow up exchange with or without additional content. That is, the conversation tracking system 10 can execute an action that flags an issue to permit intervention rather than providing additional content.

Various example communication channels 30 are shown in FIG. 2, including without limitation a live channel 32 (e.g., voice or video call), an email channel 34, an SMS channel 36, and a chat or website channel 38 such as a chat feature that is provided via a website. The communication channels 30 can be used and leveraged by the agents 26 and clients 40 to participate in the conversational exchanges as well as the conversation tracking system 10 to reach the agents 26 and/or clients 40 to execute the above-noted actions with respect to detected distractions, disinterest or missed content.

Figure 3A:
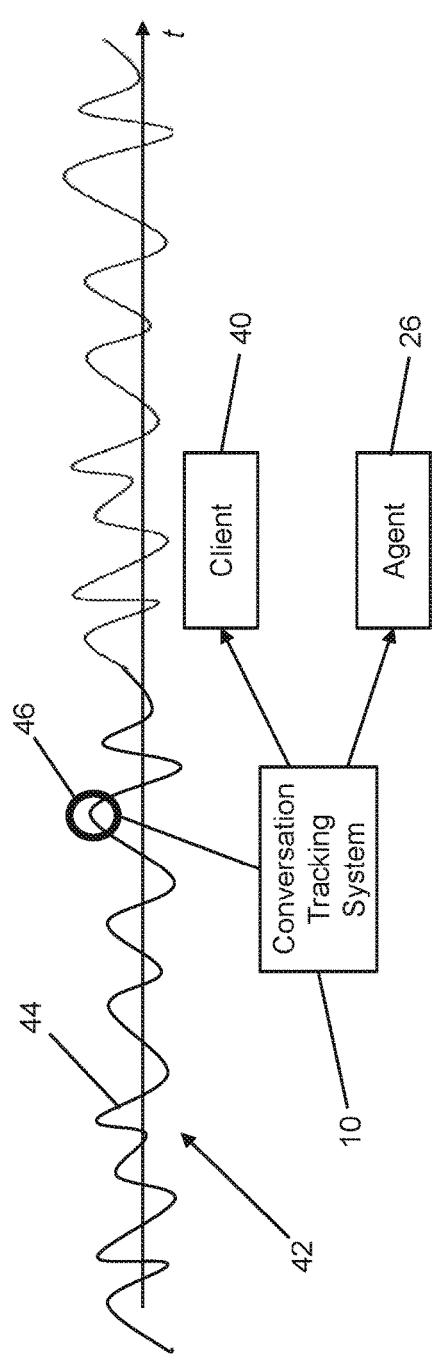
FIG. 3a is a timeline of an interaction between a client and an agent with a notification being sent to the client and/or agent during the interaction.

Referring now to FIG. 3*a*, an example of a conversational exchange 42 between a client 40 and an agent 26 is shown with a waveform 44 generally representing a back and forth exchange and the data that would be generated, e.g., a recording or script of a voice exchange. In this example, conversation tracking system 10 detects an indication 46 of a distraction, disinterest or missed content at a particular point during the conversation. In this example, the conversation tracking system 10 communicates with the client 40 and the agent 26 during the conversational exchange 42 to enable the agent 26 to correct the direction or content of the conversation. For example, the conversation tracking system 10 can detect a distraction or other reason for missing content at the indication 46 and alert the agent 26 and client 40 that something should be reiterated or skipped over (e.g., if the distraction was due to disinterest).

Figure 3B:
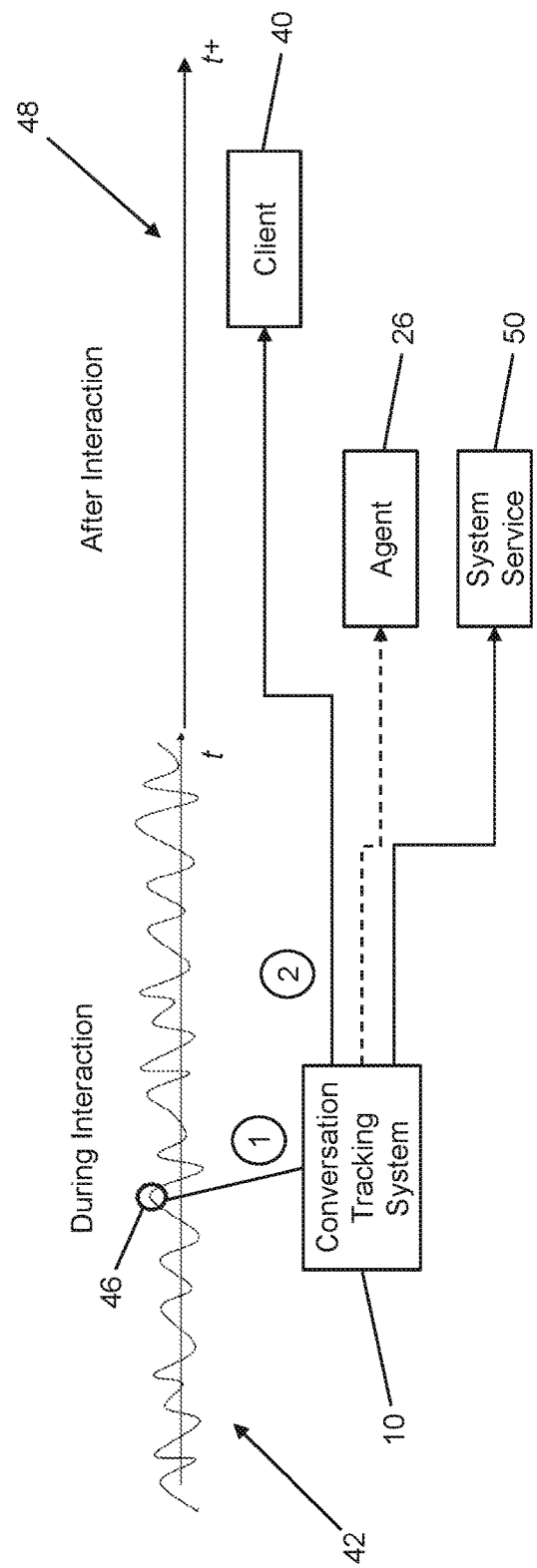
FIG. 3b is a timeline of an interaction between a client and an agent with a notification being sent to the client and/or agent and a system service after the interaction.

FIG. 3*b* illustrates an example of the conversational exchange 42 shown in FIG. 3*a* with an additional post-conversation timeline 48. In this example, the conversation tracking system 10 detects the indication 46 either during or after the conversational exchange occurs 42 and follows up with the client 40 and a system service 50 and, optionally the agent 26 to provide additional content or to otherwise make an effort to avoid the client 40 calling back for the same reason. In this example, the system service 50 is shown which represents any service that relates to the communication channels 30 or to persisting data associated with the conversational exchanges 42. For example, the system service 50 can gather data from interactive communication channels 30 to generate both conversation data 20 and context data 22 as well as updating client data 18 to provide additional value added services to the client 40.

Figure 4:
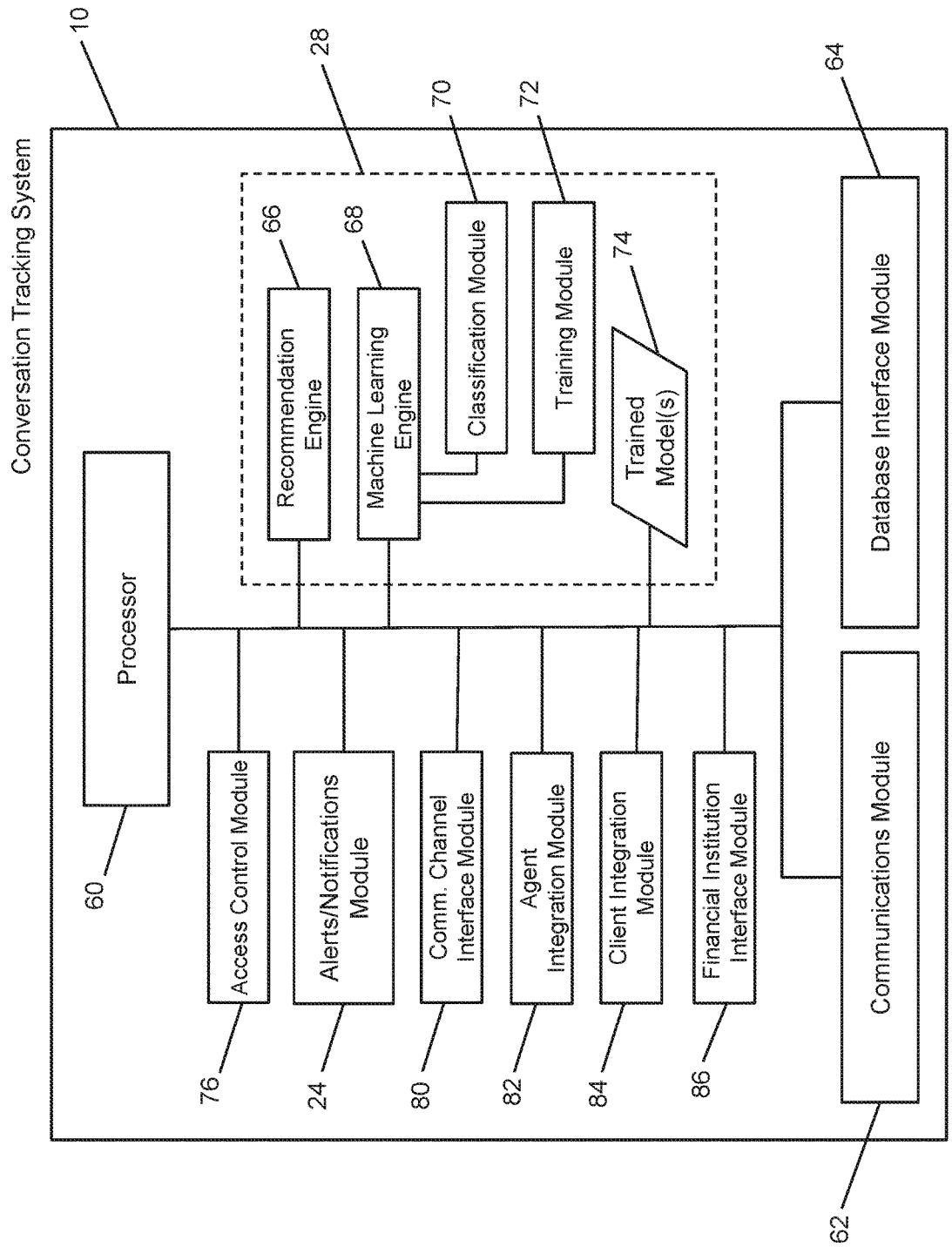
FIG. 4 is a block diagram of an example configuration of the conversation tracking system.

In FIG. 4, an example configuration of the conversation tracking system 10 is shown. In certain embodiments, the conversation tracking system 10 may include one or more processors 60, a communications module 62, and a database interface module 64 for interfacing with the datastores 20, 22 (and if permitted client data 18—see xdashed lines in FIG. 1) to retrieve, modify, and store (e,g., add) data. Communications module 62 enables the conversation tracking system 10 to communicate with one or more other components of the computing environment 8, such as client device 12 (or one of its components), via a bus or other communication network, such as the communication network 14. While not delineated in FIG. 4, the conversation tracking system 10 includes at least one memory or memory device that can include a tangible and non-transitory computer-readable, medium having stored therein computer programs, sets of instructions, code, or data to be executed by processor 60. FIG. 4 illustrates examples of modules, tools and engines stored in memory on the conversation tracking system 10 and operated by the processor 60. It can be appreciated that any of the modules, tools, and engines shown in FIG. 4 may also be hosted externally and be available to the conversation tracking system 10, e.g., via the communications module 62. In the example embodiment shown in FIG. 4, the conversation tracking system 10 includes the machine learning system 28. The machine learning system 28 in this example includes a recommendation engine 66, a machine learning engine 68, a classification module 70, a training module 72, and a trained model 74. The conversation tracking system 10 also includes an access control module 76, the alerts/notifications module 24 described above, a communication channel interface module 80, an agent integration module 82, a client integration module 84, and a financial institution interface rnodule 86.

The recommendation engine 66 is used by the conversation tracking system 10 to generate one or more recommendations the conversation tracking system 10 that is/are related to a current conversation or past conversations or other interactions between various entities to determine where typical conversations should or typically go, e.g., to determine when distractions, missed content or other deviations from a conversation occur so as to put the conversation back on a correct path. It may be noted that a recommendation as used herein may refer to a prediction, suggestion, inference, association or other recommended identifier that can be used to generate a notification, message, content, or a combination thereof that provides an action associated with a distraction, missed content or a disinterest in content, based on information that is provided to or inferred from the conversation data 20 and/or context data 22 that is gathered and/or provided to the conversation tracking system 10 and stored in one or more of the datastores 20, 22. The recommendation engine 66 can access the data in the datastores 20, 22 and, if permitted, the client data 18 (or financial data 98 stored in the financial institution system 16) via the databases interface module 64 and apply one or more inference processes to generate the recommendation(s). The recommendation engine 66 may utilize or otherwise interface with the machine learning engine 68 to both classify data currently being analyzed to generate a suggestion or recommendation, and to train classifiers using data that is continually being processed and accumulated by the conversation tracking system 10 (e.g., conversation scripts stored over time). That is, the recommendation engine 66 can learn conversation distraction, disinterest or missed content indicators from conversation data 20 and informed by context data 22, generate and improve upon one or more trained models 74 over time.

The machine learning engine 68 may also perform operations that classify the conversation and context datastores 20, 22 in accordance with corresponding classifications parameters, e.g., based on an application of one or more machine learning algorithms to each of the groups of data in datastores 18, 20, 22, 98 (also referred to herein as "conversation content", "contextual information or content", "user information" or "client information"). The machine learning algorithms may include, but are not limited to, a one-dimensional, convolutional neural network model (e.g., implemented using a corresponding neural network library, such as Keras®), and the one or more machine learning algorithms may be trained against, and adaptively improved, using elements of previously classified profile content identifying suitable matches between content identified and potential actions to be executed. Subsequent to classifying the conversation or contextual content, the recommendation engine 66 may further process each element of the content to identify, and extract, a value characterizing the corresponding one of the classification parameters, e.g., based on an application of one or more additional machine learning algorithms to each of the elements of the content. By way of example, the additional machine learning algorithms may include, but are not limited to, an adaptive NLP algorithm that, among other things, predicts starting and ending indices of a candidate parameter value within each element of the content, extracts the candidate parameter value in accordance with the predicted indices, and computes a confidence score for the candidate parameter value that reflects a probability that the candidate parameter value accurately represents the corresponding classification parameter. As described herein, the one or more additional machine learning algorithms may be trained against, and adaptively improved using, the locally maintained elements of previously classified content. Classification parameters may be stored and maintained using the classification module 70, and training data may be stored and maintained using the training module 72.

The trained model 74 may also be created, stored, refined, updated, re-trained, and referenced by the conversation tracking system 10 and/or financial institution system 16 to determine associations between users, transactions, conversations, or other contextual content. Such associations can be used to generate "people like you" recommendations or suggestions for detecting and following up regarding distractions, disinterest or missed portions of a conversation. The trained model 74 can also be used to enhance searching functions, e.g., within other parts of the financial institution system 16 such as system services 50 used to improve customer service and/or interactions. That is, the trained model 74 can be used in various functions, services, or applications utilized or provided by the financial institution system 16. In one example, the trained model 74 may correspond to a Word2Vec-type model, which may represent a group of related models that are used to produce word embeddings, e.g., shallow, two-layer neural networks that are trained to reconstruct linguistic contexts of words. It can be appreciated that the trained model 74 can also include or correspond to other types of associative models that enable associations to be made between users, transactions, conversations, and other data.

In some instances, classification data stored in the classification module 70 may identify one or more parameters, e.g., "classification" parameters, that facilitate a classification of corresponding elements or groups of recognized content based on any of the exemplary machine learning algorithms or processes described herein. The one or more classification parameters may correspond to parameters that can indicate an affinity or compatibility between the data 18, 20, 22, 68 and certain potential actions. For example, certain behaviors exhibited by a client 40 can be indicative of a distraction or otherwise missing a portion of content provided during an interaction with an agent 26, which can be trained over time to detect and determine appropriate actions to follow up with the client 40, agent 26 and/or system service 50.

In some instances, the additional, or alternate, machine learning algorithms may include one or more adaptive, NLP algorithms capable of parsing each of the classified portions of the profile content and predicting a starting and ending index of the candidate parameter value within each of the classified portions. Examples of the adaptive, NLP algorithms include, but are not limited to, NLP models that leverage machine learning processes or artificial neural network processes, such as a named entity recognition model implemented using a SpaCy® library.

Examples of these adaptive, machine learning processes include, but are not limited to, one or more artificial, neural network models, such as a one-dimensional, convolutional neural network model, e.g., implemented using a corresponding neural network library, such as Keras®. In some instances, the one-dimensional, convolutional neural network model may implement one or more classifier functions or processes, such a Softmax® classifier, capable of predicting an association between an element of conversation or context data 20, 22 (e.g., something indicative of a distraction, disinterest, or missed content) and a single classification parameter and additionally, or alternatively, multiple classification parameters.

Based on the output of the one or more machine learning algorithms or processes, such as the one-dimensional, convolutional neural network model described herein, machine learning engine 68 may perform operations that classify each of the discrete elements of conversation or context content as a corresponding one of the classification parameters, e.g., as obtained from classification data stored by the classification module 70.

The outputs of the machine learning algorithms or processes may then be used by the recommendation engine 66 to generate one or more suggested action that can be presented to the client 40, agent 26 or system service 50, either dynamically during a conversation or at a later time following offline or post-conversation processing.

Referring again to FIG. 4, the access control module 76 may be used to apply a hierarchy of permission levels or otherwise apply predetermined criteria to determine what client data 18, content stored in the datastores 20, 22 or financial data 98 can be shared with which entity in the computing environment 8. For example, the conversation tracking system 10 may have been granted access to certain sensitive client data 18 or financial data 98 for a user, which is associated with a certain client device 12 in the computing environment 8. Similarly, certain client profile data stored in the client data 18, conversation or contextual content stored in the datastores 20, 22 or financial data 98 may include potentially sensitive information such as age, date of birth, or nationality, which may not necessarily be needed by the conversation tracking system 10 to execute certain actions. As such, the access control module 76 can be used to control the sharing of certain client profile data or other client data 18 and/or content stored in the datastores 20, 22 and/or financial data 98 based on a type of client/user, a permission or preference, or any other restriction imposed by the computing environment 8 or application in which the conversation tracking system 10 is used.

The conversation tracking system 10 may also include the alerts/notifications module 24 configured to send alerts or notification via appropriate channels based on actions determined appropriate by the conversation tracking system 10. The conversation tracking system 10 may also include a communication channel interface module 80 to enable the conversation tracking system 10 to access various communication channels that are or may be used by the clients 40 and agents 26.

The conversation tracking system 10 may also include an agent integration module 82 that is provided to enable agents 26 in the computing environment 8 to communicate with the conversation tracking system 10, e.g., via an existing banking application or other application used by the agent for interfacing with the financial institution system 16. The agent integration module 82 can take the form of an application programming interface (API), software development kit (SDK) or any other software, plug-in, agent, or tool that allows the conversation tracking system 10 to be integrated with or within an application associated with another entity. For example, the agent integration module 82 can enable conversation tracking functionality to be integrated into a financial institution application 120 (see FIG. 6) to enable users of the client devices 12 to receive alerts and notifications from the conversation tracking system 10 during and/or following interactions such as conversations with another entity in the computing environment 8.

The conversation tracking system 10 may also include a client integration module 84 that provides similar functionality as the agent integration module 82 but for integrating the conversation tracking functionality with an application (e.g., financial institution application 120 in FIG. 6) used by the client 40. It can be appreciated that the agent integration module 82 and client integration module 84 are shown separately in FIG. 4 for illustrative purposes and the functionality thereof could instead be integrated into a single module.

In this example embodiment, the integration modules 82, 84 and alerts/notifications module 24 are integrated within the conversation tracking system 10 to leverage the recommendation engine 66 and machine learning engine 68 to intelligently determine associations, generate suggested or recommended actions to be performed or content to be included in alerts or notifications sent to the clients 40 and/or agents 26 during or after a conversation between such entities.

Figure 5:
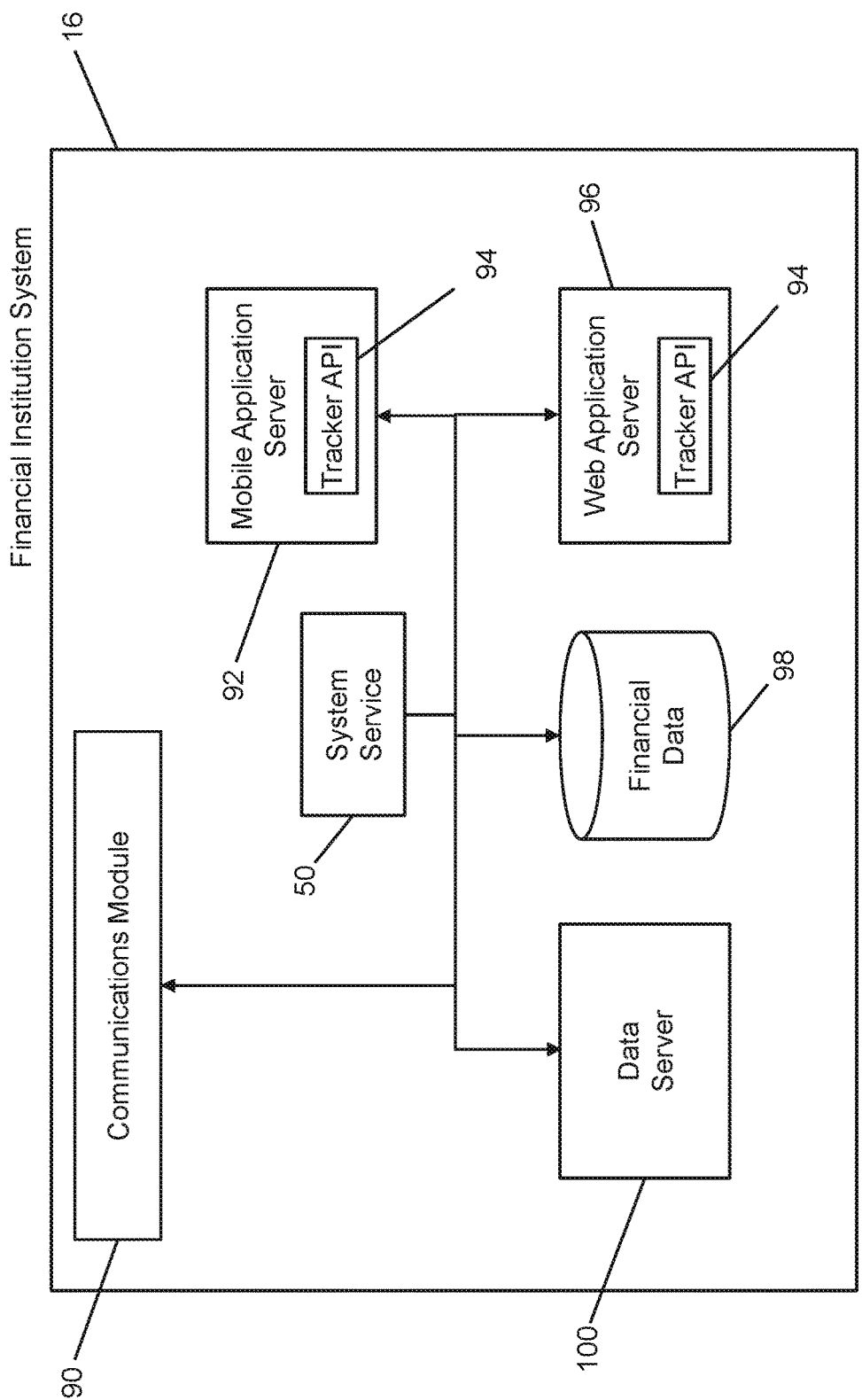
FIG. 5 is a block diagram of an example configuration of a financial institution system.

The conversation tracking system 10 may also include a financial institution interface module 86 to provide a graphical user interface (GUI) or API connectivity to communicate with the financial institution system 16 to obtain client data 18 and financial data 98 for a certain user (see FIG. 5). It can be appreciated that the financial institution interface module 86 may also provide a web browser-based interface, an application or "app" interface, a machine language interface, etc.

In FIG. 5, an example configuration of the financial institution system 16 is shown. The financial institution system 16 includes a communications module 90 that enables the financial institution system 16 to communicate with one or more other components of the computing environment 8, such as client device 12 (or one of its components) or conversation tracking system 10, via a bus or other communication network, such as the communication network 14. While not delineated in FIG. 5, the system 16 includes at least one memory or memory device that can include a tangible and non-transitory computer-readable, medium having stored therein computer programs, sets of instructions, code, or data to be executed by one or more processors (not shown for clarity of illustration). FIG. 5 illustrates examples of servers and datastoresidatabases operable within the system 16. It can be appreciated that any of the components shown in FIG. 5 may also be hosted externally and be available, to the system 16, e.g., via the communications module 90. In the example embodiment shown in FIG. 5, the financial institution system 16 includes one or more servers to provide access to the client data 18 (which may be included in the financial data 98 or stored separately as shown in FIG. 1) to the conversation tracking system 10 to enable the conversation tracking system 10 to enable tags to be created and for tags to be learned, suggested and/or recommended to the user. Exemplary servers include a mobile application server 92, a web application server 96 and a data server 100. Although not shown in FIG. 5, as noted above, the system 16 may also include a cryptographic server for performing cryptographic operations and providing cryptographic services. The cryptographic server can also be configured to communicate and operate with a cryptographic infrastructure. The financial institution system 16 may also include one or more data storages for storing and providing data for use in such services, such as data storage for storing financial data 98.

Mobile application server 92 supports interactions with a mobile application installed on client device 12. Mobile application server 92 can access other resources of the financial institution system 16 to carry out requests made by, and to provide content and data to, a mobile application on client device 12. In certain example embodiments, mobile application server 92 supports a mobile banking application to provide payments from one or more accounts of user, among other things. As shown in FIG. 5, the mobile application server 92 can include a tracker API 94 which enables the mobile application to integrate or otherwise coordinate or work with the conversation tracking system 10 to provide a conversation tracking functionality. For example, the tracking API 94 can communicate with the conversation tracking system 10 via the financial institution integration module 86 in the conversation tracking system 10 (see FIG. 4).

Web application server 96 supports interactions using a website accessed by a web browser application 122 (see FIG. 6) running on the client device 12. It can be appreciated that the mobile application server 92 and the web application server 96 can provide different front ends for the same application, that is, the mobile (app) and web (browser) versions of the same application. For example, the financial institution system 16 may provide a banking application that be accessed via a smartphone or tablet app while also being accessible via a browser on any browser-enabled device. As shown in FIG. 5, the web application server 96 may also include a tracking API 94 to enable the web application to integrate or otherwise coordinate or work with the conversation tracking system 10 to provide conversation tracking functionality.

The financial data 98 may be associated with users of the client devices 12 (e.g., customers of the financial institution). The financial data 98 may include any data related to or derived from financial values or metrics associated with customers of the financial institution system 16, for example, account balances, transaction histories, line of credit available, credit scores, mortgage balances, affordability metrics, investment account balances, investment values and types, among many others. Other metrics can be associated with the financial data 98, such as financial health data that is indicative of the financial health of the users of the client devices 12. As indicated above, it can be appreciated that the client data 18 shown in FIG. 1 may be part of the financial data 98 held by the financial institution system 16 and is shown separately for ease of illustration and ease of reference herein.

The system service 50 is shown in FIG. 5 to illustrate that various services within the financial institution system 16 can integrate with the conversation tracking system 10 as herein described.

Figure 6:
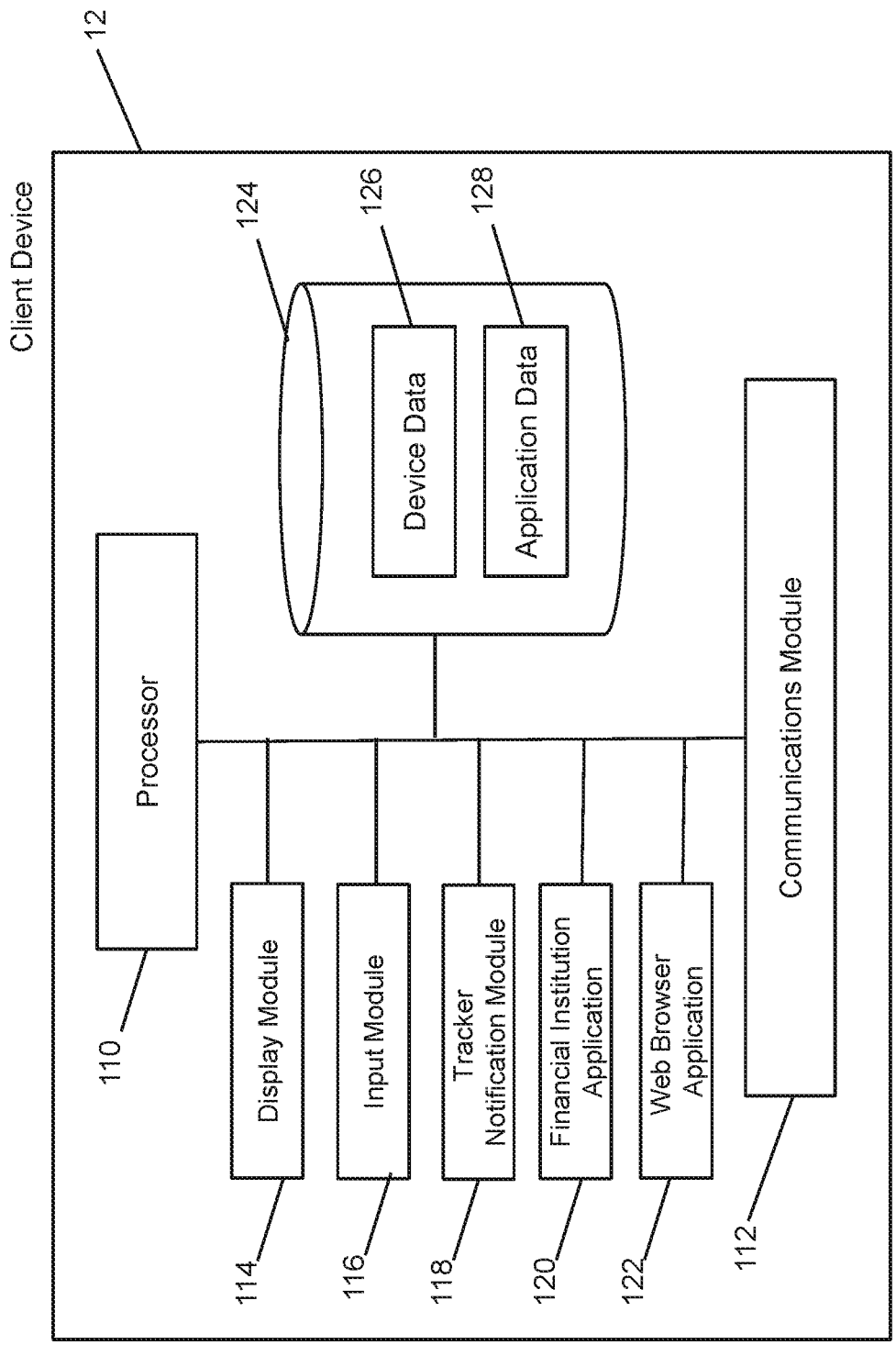
FIG. 6 is a block diagram of an example configuration of a client computing device associated with a user, customer, or client.

In FIG. 6, an example configuration of the client device 12 is shown. In certain embodiments, the client device 12 may include one or more processors 110, a communications module 112, and a data store 124 storing device data 126 and application data 128. Communications module 112 enables the client device 12 to communicate with one or more other components of the computing environment 8, such as conversation tracking system 10 or financial institution system 16, via a bus or other communication network, such as the communication network 14. While not delineated in FIG. 6, the client device 12 includes at least one memory or memory device that can include a tangible, and non-transitory computer-readable medium having stored therein computer programs, sets of instructions, code, or data to be executed by processor 110. FIG. 6 illustrates examples of modules and applications stored in memory on the client device 12 and operated by the processor 110. It can be appreciated that any of the modules and applications shown in FIG. 6 may also be hosted externally and be available to the client device 12, e.g., via the communications module 112.

In the example embodiment shown in FIG. 6, the client device 12 includes a display module 114 for rendering GUIs and other visual outputs on a display device such as a display screen, and an input module 116 for processing user or other inputs received at the client device 12, e.g., via a touchscreen, input button, transceiver, microphone, keyboard, etc. As noted above, the client device 12 can use such an input module 116 to gather inputs that are indicative of behavioral cues, facial recognition, presence detection, etc. The client device 12 may also include a tracker notification module 118, which may take the form of a customized app, plug-in, widget, or software component provided by the conversation tracking system 10 for use by the client device 12 to receive and interact with alerts and notifications provided to the client device 12 by the conversation tracking system 10. As indicated above, such functionality can be a stand-alone application or be a page, tab or portion of another application such as a mobile banking application. The tracker notification module 118 may also be navigable to/from such an application. Similarly, the client device 12 may include a financial institution application 120 provided by their financial institution system 16, e.g., for performing mobile banking operations. The client device 12 in this example embodiment also includes a web browser application 122 for accessing Internet-based content, e.g., via a mobile or traditional website. The data store 124 may be used to store device data 126, such as, but not limited to, an IP address or a MAC address that uniquely identifies client device 12 within environment 8. The data store 124 may also be used to store application data 128, such as, but not limited to, login credentials, user preferences, cryptographic data (e.g., cryptographic keys), etc.

It will be appreciated that only certain modules, applications, tools and engines are shown in FIGS. 2 to 6 for ease of illustration and various other components would be provided and utilized by the conversation tracking system 10, financial institution system 16, and client device 12, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in conversation tracking system 10 or financial institution system 16, or client device 12, or accessible or connectable thereto. Any application or module herein described may be implemented using computer readable/executable instructions that may be stored or otherwise held by such computer readable media.

Figure 7:
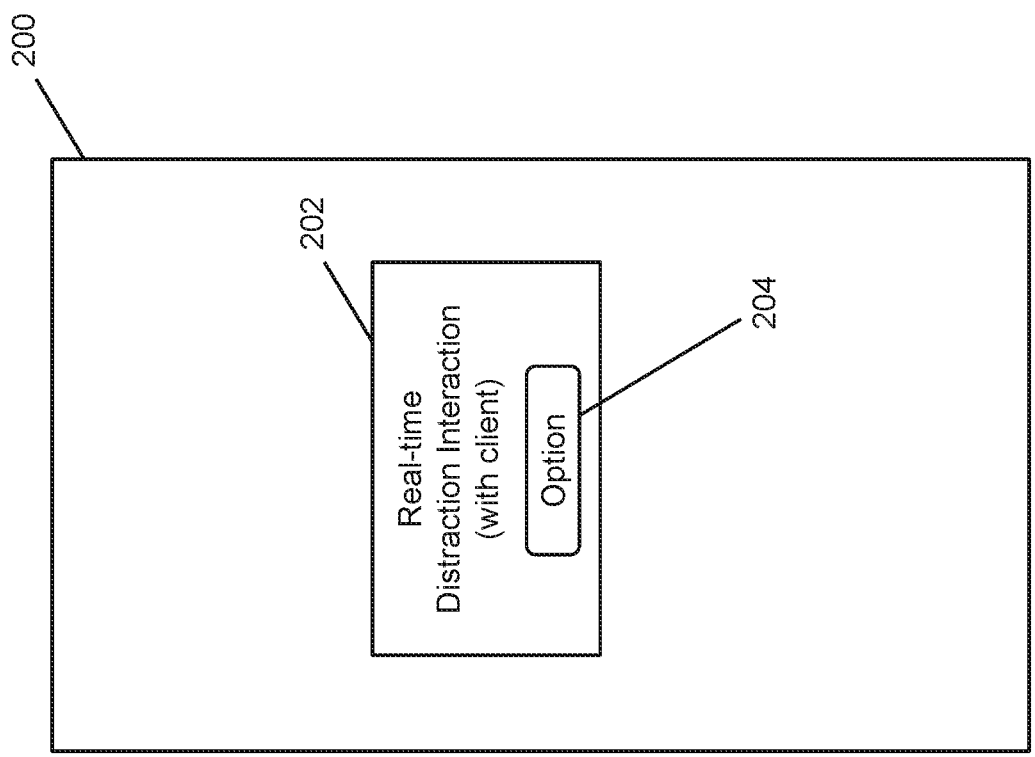
FIG. 7 is an example of a graphical user interface in which a client notification is being displayed during an interaction with an agent.

FIG. 7 illustrates an example of a client device user interface 200 that displays an alert or notification 202 provided to the client 40 and displayed by their client device 12. In this example it can be seen that the alert or notification 202 is sent in real-time or otherwise during the conversational exchange 42 in response to a distraction or other indication that the client 40 may have missed some content. The alert or notification 202 provides an option 204, which can allow the client 40 to flag something they have missed or to dismiss the alert. For example, the client 40 may have exhibited being distracted for being disinterested in a portion of the conversational exchange discussing content they are familiar with. The option 204 allows the client 40 dismiss this as being unimportant or to perhaps flag to the agent 26 that they can skip over this portion of the content.

Figure 8:
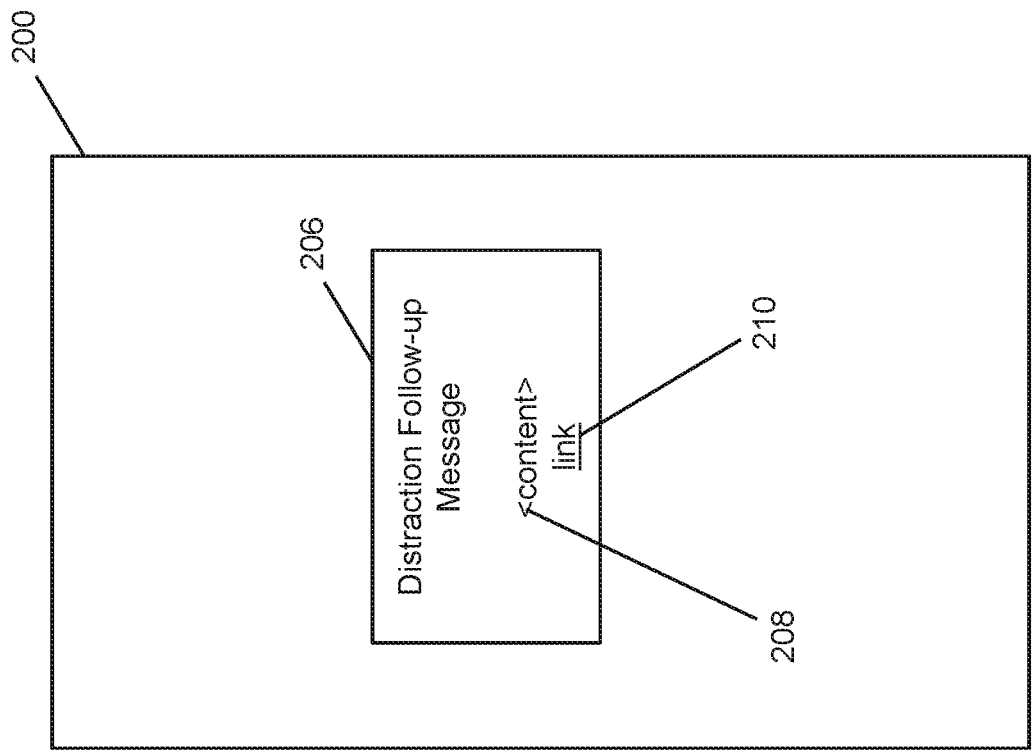
FIG. 8 is an example of a graphical user interface in which a client notification is being displayed after an interaction with an agent.

In FIG. 8, the user interface 200 is shown displaying a follow up message 206 that is sent to the client 40 after the conversational exchange after detecting that there was a distraction, disinterest or missed content. For example, the conversation tracking system 10 can analyze a conversation script, recording, or message exchange and detect certain content that may be of interest to provide additional information or to avoid the client 40 needing to content an agent 26 again and increase overall AHT. In this example, the follow up notification 206 includes content 208 and can include a link 210 to additional content. For example, the conversation tracking system 10 can detect a difficultly in understanding a feature of a website or mobile app and provide a tutorial or demo for that feature that the client 40 can use offline at that time or later on to avoid the need to contact an agent 26 again.

Figure 9:
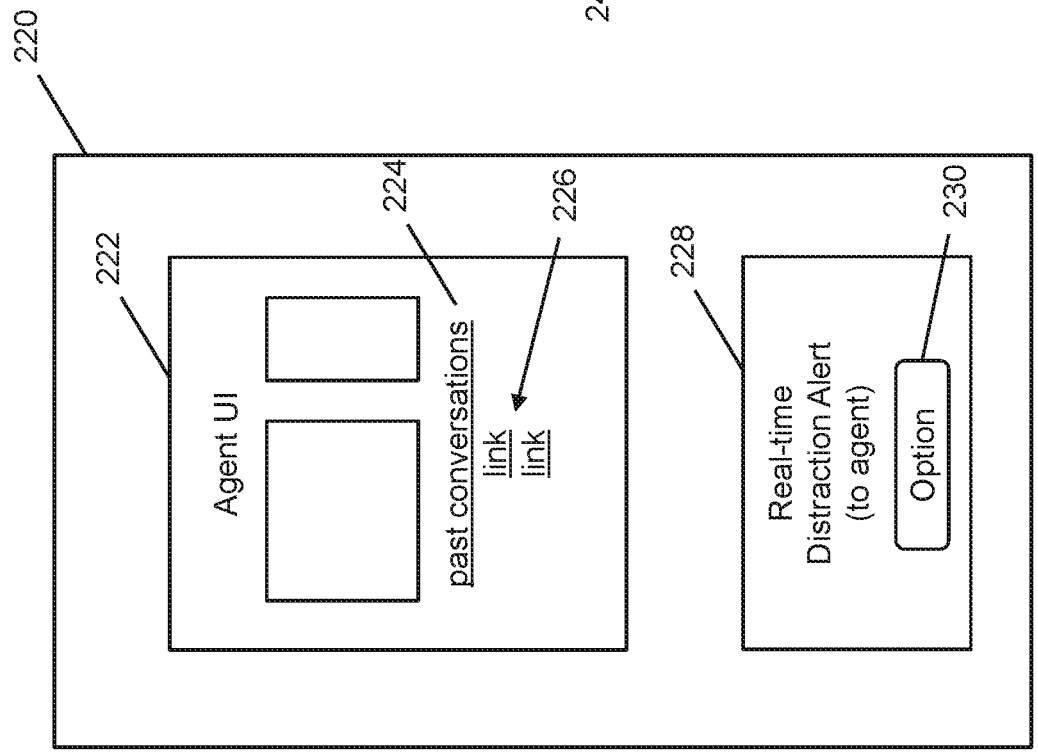
FIG. 9 is an example of a graphical user interface in which an agent notification is being displayed during an interaction with a client.

FIG. 9 illustrates a user interface 220 for a client device 12 utilized by an agent 20 to connect to an agent user interface (UI) 222. The agent UI 22 represents any software tool, dashboard or console program used by the agent 26 in servicing clients 40. In this example, the agent UI 222 includes a past conversations link 224 to pull in conversation data 20 for the client 40 with which the agent 26 is engaged and other links 226 to context data 22 or tools available to the agent 26 during the conversational exchange 42. For example, the links 226 can include an option to create an alert or notification to be sent to the client 40 during or after the conversational exchange 42. Such an alert or notification can be triggered by the agent 26 or in conjunction with the conversation tracking system 10. In this example, the user interface 220 for the agent 26 also displays a real-time distraction alert 228 that includes an option 230. For example, the option 230 can allow the agent 26 to send additional content or messages to the client 40 or to trigger a flag associated with a topic being discussed at that time. The option 230 can also provide the agent 26 with an ability to open a new communication channel 30 to further engage the client 40 to ensure the topic is resolved during that conversational exchange 42.

Figure 10:
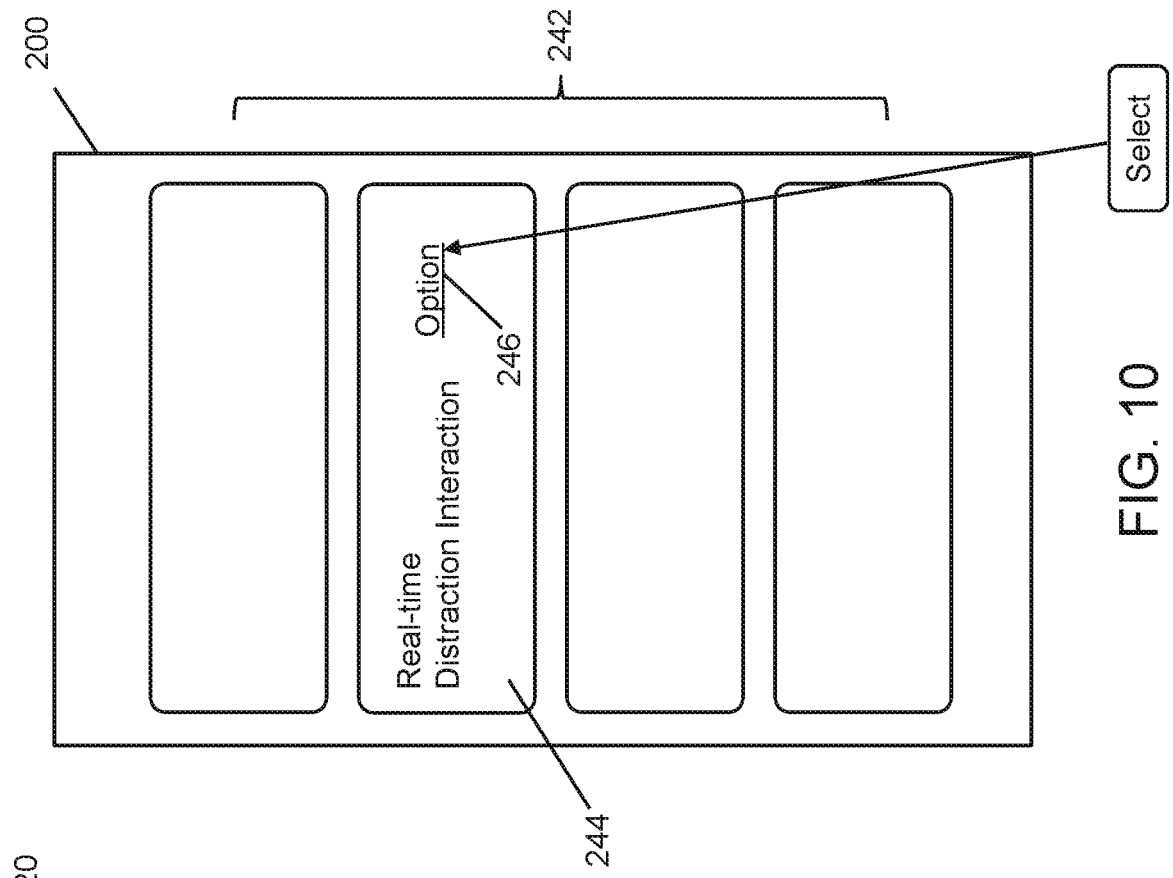
FIG. 10 is an example of a graphical user interface in which a push notification is being displayed on a client device during an interaction with an agent.

FIG. 10 illustrates the client user interface 200 with a list of push notifications 242. The list 242 includes various push notifications 244 associated with various applications and services used by that client 40. In this example, a real-time distraction notification is provided in a push notification 244 with an option 246 to enter into a new conversation path or to obtain additional information. The push notification 244 can also be used as a way to engage the client 40 by the agent 26 outside of the main communication channel 30 being used. For example, the agent 26 may be servicing the client 40 via phone channel 32 but wish to reach the client 40 in parallel with the conversation by sending content to their client device 12 via a push notification 244.

Referring now to FIG. 11, an example embodiment of computer executable instructions for analyzing and reacting to interactions between entities such as agents 26 and clients 40, which are using electronic communication channels 30 is shown. At block 300, the conversation tracking system 10 receives or otherwise obtains data captured from a conversation exchange 42 between entities such as a client 40 that has engaged an agent 26 for a customer service inquiry using a communication channel 30. At block 302, the conversation tracking system 10 analyzes the captured data to detect an indication 46 that the first entity (e.g., client 40) is or was distracted, is or was disinterested, or missed a portion of the conversational exchange 42. As implied, this can be done in real-time during the conversational exchange 42 or after the fact and can detect any indication 46 that a follow-up, intervention, additional content or other adjustment to the exchange be made. At block 304, the conversation tracking system 10 determines an action to address the distraction, disinterest, or missed portion of content based on the indication 46. For example, the conversation tracking system 10 can use the alerts/notifications module 24 to select an appropriate communication channel 30 and content or link(s) within the alert or notification to provide additional information or to steer the conversation back on track. At block 306, the conversation tracking system 10 provides an automated message to at least one of the entities (e.g., the client 40 and/or the agent 26 and/or a system service 50) to execute the action. Optionally, as shown in dashed lines in FIG. 11, the conversation tracking system 10 can include additional content in the automated message or a link to such content, at block 308.

Figure 12:
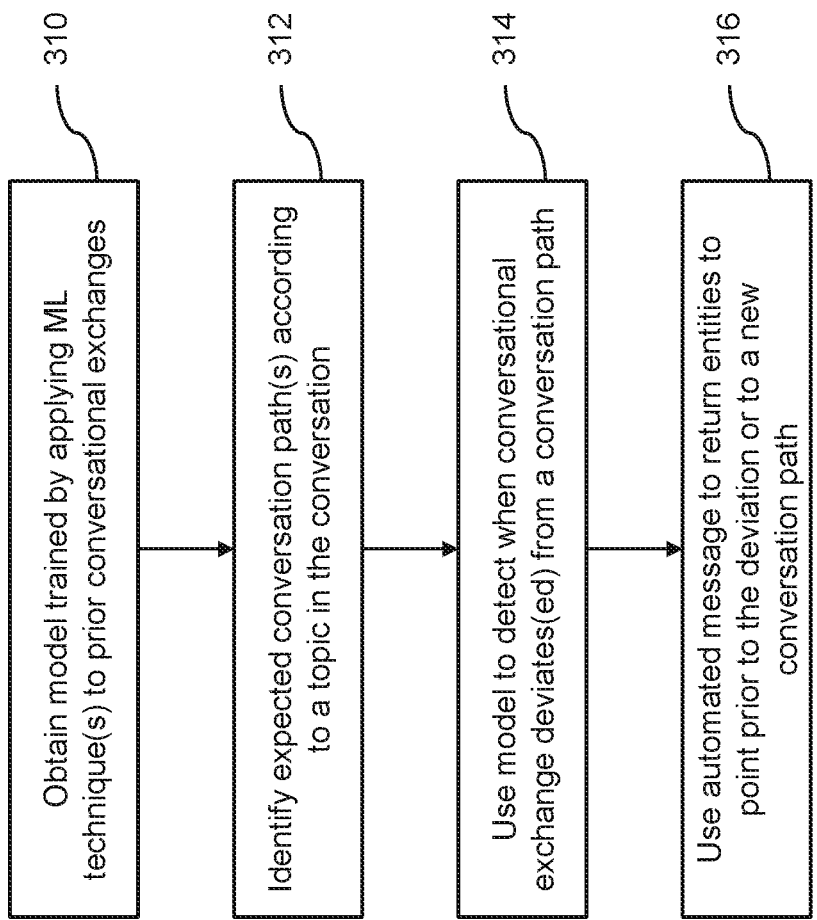
FIG. 12 is a flow diagram of an example of computer executable instructions for applying machine learning models to prior conversations to return entities to a point prior to a deviation in a conversation path or on a new conversation path.

Referring now to FIG. 12, an example embodiment of computer executable instructions for applying machine learning models to prior conversations to return entities to a point prior to a deviation in a conversation path or on a new conversation path is shown. As noted above, the machine learning system 28 can be used to train models based on other conversations to enable the conversation tracking system 10 to provide alerts or notifications that direct the agent 26 and client 40 back to a conversation path based on detecting that they have deviated from a path that is normally followed in similar conversational exchanges 26 (e.g., with other clients 40). At block 310, the machine learning system 28 or conversation tracking system 10 obtains a model trained by applying one or more machine learning (ML) techniques to prior conversational exchanges (e.g., from conversation data 20). Using this model, the machine learning system 28 or conversation tracking system 10 can identify expected conversation paths according to a topic identified in the conversational exchange 42 at block 312. At block 314, the machine learning system 28 or conversation tracking system 10 can use the model to detect when the conversational exchange 42 deviates or has deviated from a certain conversation path and, at block 316, can use the automated message to return entities to a point prior to where they deviated from the conversation path, or to a new conversation path to rectify the deviation.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A tracking system for analyzing and reacting to interactions between entities using electronic communication channels, the system comprising:
   a processor;
   a communications module coupled to the processor; and
   a memory coupled to the processor, the memory storing computer executable instructions that when executed by the processor cause the processor to:
      receive, via the communications module, data captured from a conversational exchange between a first entity communicating with a second entity using a first electronic communication channel;
      analyze the captured data to detect an indication that content was missed or not understood by the first entity as a result of detecting that the first entity was:
   distracted during a portion of the conversational exchange, disinterested in the portion of the conversational exchange, or missed the portion of the conversational exchange;
      determine, based on the indication, content associated with the portion of the conversational exchange that was missed or not understood; and
      provide, via the communications module, to a tracker notification module on a client device of the second entity, using a second electronic communication channel different than the first electronic communication channel, an automated message comprising the content or a link to the content, to the second entity, wherein the content or the link to the content is provided via the second electronic communication channel by having the tracker notification module display the automated message in an application used by at least the second entity while the conversational exchange is occurring via the first electronic communication channel, wherein the tracker notification module comprises a software component provided by the tracking system to interact with the automated message via the application used by the second entity.

2. The device tracking system of claim 1, wherein the computer executable instructions further cause the processor to:
   obtain a model trained by applying one or more machine learning techniques to prior conversational exchanges between a plurality of entities to identify one or more expected conversation paths according to a topic associated with conversational exchange between the first and second entities;
   use the model to detect when the conversational exchange deviated from one of the expected conversation paths; and use the automated message, via the communications module, to return the first and second entities to a point prior to the deviation or to a new conversation path.

3. The tracking system of claim 1, wherein the automated message is also sent to the first entity via the communications module, following a termination of the conversational exchange and includes the content or the link to the content associated with the portion of the conversation exchange to supplement the conversational exchange.

4. The tracking system of claim 1, wherein the computer executable instructions further cause the processor to:
generate a conversation script from the captured data, wherein the conversation script is analyzed to detect the distraction during, disinterest in, or missing of, the portion of the conversational exchange.

5. The tracking system of claim 4, wherein the automated message comprises a portion of the conversation script or a link to the conversation script.

6. The tracking system of claim 5, wherein the computer executable instructions further cause the processor to:
include a link to additional content associated with the portion of the conversation exchange, in the automated message.

7. The tracking system of claim 1, wherein a notification is also sent to the first entity regarding the distraction during, disinterest in, or missing of, the portion of the conversational exchange.

8. The tracking system of claim 7, wherein the notification provides an option to flag the portion of the conversational exchange for reiteration.

9. The tracking system of claim 7, wherein the notification provides an option to skip over the portion of the conversation exchange.

10. The tracking system of claim 1, wherein the automated message comprises a notification sent to the second entity, via the communications module, flagging the indication of the distraction during, disinterest in, or missing of, the portion of the conversational exchange.

11. The tracking system of claim 10, wherein the notification provides an option to send additional information to the first entity.

12. The device tracking system of claim 10, wherein the notification provides an option to trigger an automated conversation follow-up message to be sent via the communications module, a period of time after the conversational exchange terminates.

13. A method of analyzing and reacting to interactions between entities using electronic communication channels, the method executed by a device having a communications module and comprising:
receiving, via the communications module, data captured from a conversational exchange between a first entity communicating with a second entity using a first electronic communication channel;
analyzing the captured data to detect an indication that content was missed or not understood by the first entity as a result of detecting that the first entity was: distracted during a portion of the conversational exchange, disinterested in the portion of the conversational exchange, or missed the portion of the conversational exchange;
determining, based on the indication, content associated with the portion of the conversational exchange that was missed or not understood; and
providing, via the communications module, to a tracker notification module on a client device of the second entity, using a second electronic communication channel different than the first electronic communication channel, an automated message comprising the content or a link to the content, to the second entity, wherein the content or the link to the content is provided via the second electronic communication channel by having the tracker notification module display the automated message in an application used by at least the second entity while the conversational exchange is occurring via the first electronic communication channel, wherein the tracker notification module comprises a software component provided by the tracking system to interact with the automated message via the application used by the second entity.

14. The method of claim 13, further comprising:
obtaining a model trained by applying one or more machine learning techniques to prior conversational exchanges between a plurality of entities to identify one or more expected conversation paths according to a topic associated with conversational exchange between the first and second entities;
using the model to detect when the conversational exchange deviated from one of the expected conversation paths; and
using the automated message, via the communications module, to return the first and second entities to a point prior to the deviation or to a new conversation path.

15. The method of claim 13, wherein the automated message is also sent to the first entity via the communications module, following a termination of the conversational exchange and includes the content or the link to the content associated with the portion of the conversation exchange to supplement the conversational exchange.

16. The method of claim 13, further comprising:
generating a conversation script from the captured data, wherein the conversation script is analyzed to detect the distraction during, disinterest in, or missing of, the portion of the conversational exchange.

17. The method of claim 16, wherein the automated message comprises a portion of the conversation script or a link to the conversation script.

18. The method of claim 13, wherein a notification is also sent to the first entity regarding the distraction during, disinterest in, or missing of, the portion of the conversational exchange.

19. The method of claim 13, wherein the automated message comprises a notification sent to the second entity, via the communications module, flagging the indication of the distraction during, disinterest in, or missing of, the portion of the conversational exchange.

20. A non-transitory computer readable medium for analyzing and reacting to interactions between entities using electronic communication channels, the computer readable medium comprising computer executable instructions for:
receiving, via a communications module, data captured from a conversational exchange between a first entity communicating with a second entity using a first electronic communication channel;
analyzing the captured data to detect an indication that content was missed or not understood by the first entity as a result of detecting that the first entity was: distracted during a portion of the conversational exchange, disinterested in the portion of the conversational exchange, or missed the portion of the conversational exchange;
determining, based on the indication, content associated with the portion of the conversational exchange that was missed or not understood; and providing, via the communications module, to a tracker notification module on a client device of the second entity, using a second electronic communication channel different than the first electronic communication channel, an automated message comprising the content or a link to the content, to the second entity, wherein the content or the link to the content is provided via the second electronic communication channel by displaying having the tracker notification module display the automated message in an application used by at least the second entity while the conversational exchange is occurring via the first electronic communication channel, wherein the tracker notification module comprises a software component provided by the tracking system to interact with the automated message via the application used by the second entity.

\* \* \* \* \*